United States Patent
Lilley et al.

[11] Patent Number: 5,974,958
[45] Date of Patent: Nov. 2, 1999

[54] CREAM DEPOSITING APPARATUS

[75] Inventors: Ian Peter Lilley, Peterborough; Edmund Smith, Lincolnshire; Thomas Moyses, Peterborough, all of United Kingdom

[73] Assignee: APV UK Limited, Windsor, United Kingdom

[21] Appl. No.: 08/817,713

[22] PCT Filed: Oct. 18, 1995

[86] PCT No.: PCT/GB95/02452

§ 371 Date: Apr. 16, 1997

§ 102(e) Date: Apr. 16, 1997

[87] PCT Pub. No.: WO96/12409

PCT Pub. Date: May 2, 1996

[30] Foreign Application Priority Data

Oct. 19, 1994 [GB] United Kingdom ............... 9421037

[51] Int. Cl.⁶ ............... A21C 9/04; B29C 47/30
[52] U.S. Cl. ............ 99/450.4; 99/450.7; 118/25; 425/310; 425/381; 425/382 R; 425/463; 426/516
[58] Field of Search ............... 425/112, 113, 425/308, 381, 382 R, 310, 382.3, 463; 426/516; 99/450.4, 450.7; 118/25; 222/486

[56] References Cited

U.S. PATENT DOCUMENTS

| 3,340,824 | 9/1967 | Talbot | 425/381 |
| 4,162,882 | 7/1979 | Rose | 425/382 R |
| 4,469,021 | 9/1984 | Rose et al. | 425/382.3 |
| 4,615,264 | 10/1986 | Rose | 425/382.3 |
| 4,708,054 | 11/1987 | Newbery et al. | 425/382.3 |

*Primary Examiner*—Harold Pyon
*Assistant Examiner*—Joseph Leyson
*Attorney, Agent, or Firm*—Kane, Dalsimer, Sullivan and Levy, LLP

[57] ABSTRACT

A cream depositing machine including a rotatable stencil drum (2) having first and second stencil ports (3, 4), a device (5) for rotating the drum (2), a first and second cream supply device (12, 13) for supplying first and second cream material separately to the ports (3, 4), a cream control device (10, 16) within the drum (2) and operable, in time sequence, to initially cause the first cream material to issue from the first stencil port (3) and thereafter, after angular movement of the drum (2), to cause the second cream material to issue from the second stencil port (4) whereby deposits of the first and second cream material co-exist on the drum (2), and a device (15) for simultaneously removing the co-existing deposits.

12 Claims, 9 Drawing Sheets

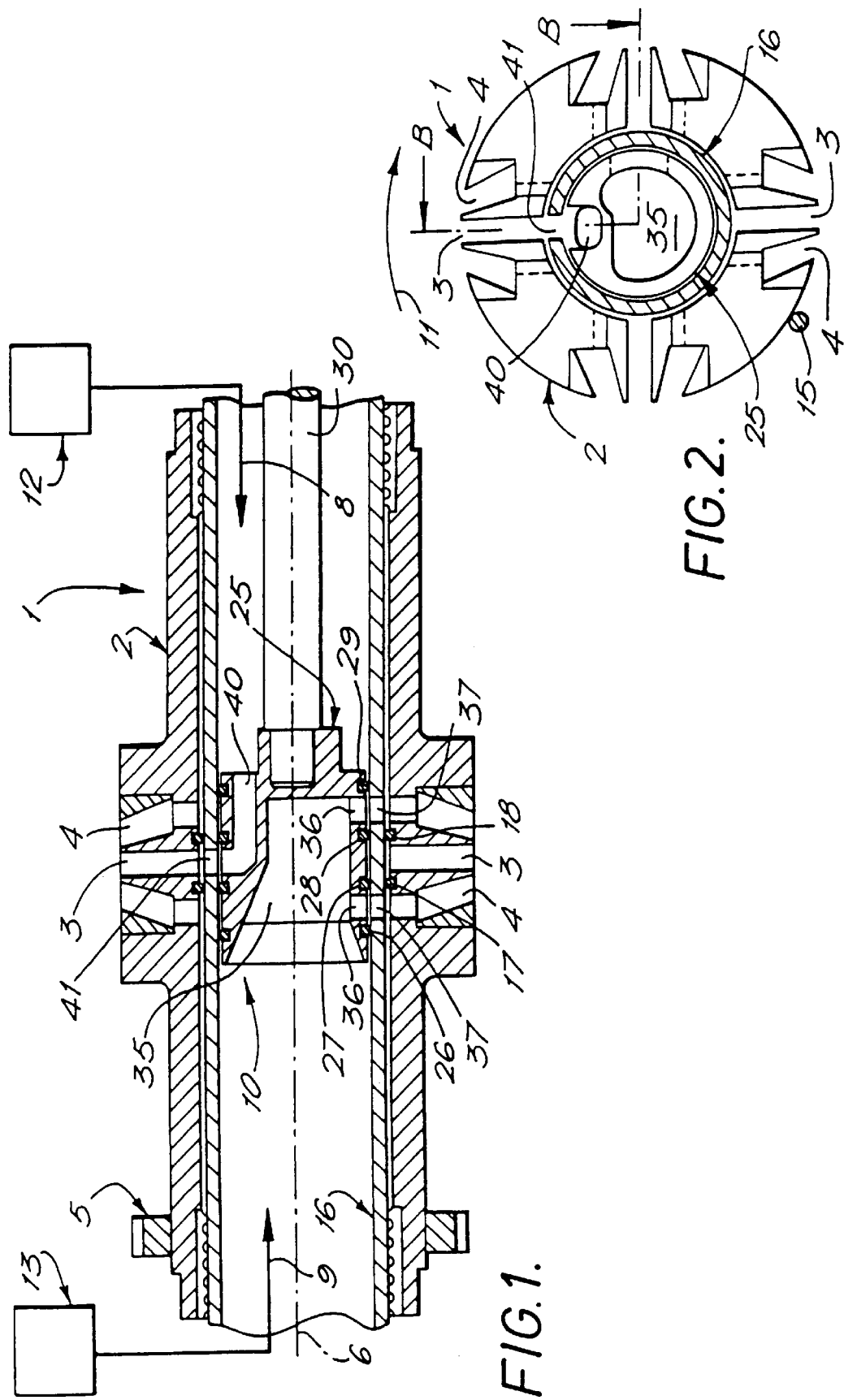

5,974,958

CREAM DEPOSITING APPARATUS

This invention relates to cream depositing and provides a method of, and a machine for, the simultaneous deposit of two separate creams onto a biscuit base to form a dual-cream sandwich biscuit. The term 'cream' as used herein is intended to relate to any form of flowable material having a paste-like consistency, typically jam and cream confections.

Machines used to deposit a single cream onto a biscuit are well known in the biscuit industry. Typical prior art machines are disclosed by United Kingdom Patent No. GB 2111365 and U.S. Pat. Nos. 3,340,824 (Talbot) and 4,162,882 (Rose). The machines so disclosed each comprise a single cream feed to rotating cream depositing heads. The feed is generally along the inside of a stationary stencil tube which has ports that are brought into register with the stencil ports mounted on a cylinder or drum, concentric with the stencil tube. The stencil drum is rotated and the ports in the stencil tube and stencil drum are so arranged as to come into register for a sufficient period of time to allow for the desired quantity of cream to be extruded from the stencil ports. Biscuits are conveyed in a timed manner so as to arrive at the creaming head to register with the stencil. The cream is usually cut from the stencil using a stationary wire in contact with the stencil drum, allowing the cream to be deposited onto the biscuit. Sets of stencils are arranged at regular angular intervals to suit the rotation speed of the stencil drum and the conveyor speed.

Methods such as these have been adapted in order to achieve a dual deposit of dissimilar creams onto biscuit bases by sequentially depositing the two creams using two creaming heads, with the biscuits being indexed from the first to the second creaming head. This has lead to difficulties in positioning the biscuits to receive the second cream deposit in a sufficiently consistent manner, especially at the high operational speeds necessary in the commercial biscuit industry.

According to one aspect of the present invention, a cream depositing machine comprises a rotatable stencil drum having first and second stencil ports disposed in close proximity, means for causing the drum to rotate, a first-cream supply means and a second-cream supply means for respectively supplying first and second cream material separately to each of the ports, cream control means within the drum and operable, in time sequence, to initially cause first cream material to issue from the first stencil port and thereafter, after angular movement of the stencil drum, to cause second cream material to issue from the second stencil port, whereby deposits of first and second cream material co-exist on the stencil drum, and means for simultaneously removing said co-existing deposits.

The cream control means may comprise a stencil tube, a flow control valve, and through-openings formed in the stencil tube for outward flow of cream material from the interior of the stencil tube.

According to a second aspect of the present invention, a method of producing co-existing deposits of first and second cream materials comprises the steps of initially creating a first deposit consisting of first cream material, and thereafter, following a timed interval, creating a second deposit, consisting of second cream material in close proximity to said first deposit, and simultaneously removing both deposits for subsequent use.

Said subsequent use may comprise placement on a biscuit or other edible artefact.

According to a third aspect of the present invention, a cream depositing machine comprises two rotatable stencil drums in tandem, a first first-cream supply means and a first second-cream supply means for supplying one of the stencil drums separately with first and second cream materials, a second first-cream supply means and a second second-cream supply means for supplying the other stencil drum separately with first and second cream materials, each stencil drum having first and second stencil ports disposed in close proximity, means for causing the drums to rotate, means for supplying first and second cream material separately to each of the ports, cream control means within the drum and operable, in time sequence, to initially cause first cream material to issue from the first stencil port and thereafter, after angular movement of the stencil drum, to cause second cream material to issue from the second stencil port, whereby deposits of first and second cream material co-exist on the stencil drums, and means for simultaneously removing said co-existing deposits, and connecting means for selectively connecting the first first-cream supply means to the second first-cream supply means, and the first second-cream supply means to the second second-cream supply means.

It is also preferable that the cream control means is operable to prevent the first or second cream from issuing from the drum, when the connecting means is operative to connect the pairs of supply means.

The cream control means may comprise a stencil tube, a flow control valve, and through-openings formed in the stencil tube for outward flow of cream material from the interior of the stencil tube, and preferably the connection means comprises passages formed in the stencil tube and said passages are preferably in the form of connection channels in the stencil tube wall.

Preferably the connection means additionally comprises connection ports in the flow control valve, the valve being operable to register the connection ports with the connection channels formed in the stencil tube wall.

A further aspect of the present invention therefore comprises an edible artefact having co-existing deposits of first and second cream deposits placed thereon.

The various aspects of the invention will now be described, by way of example only, with reference to the accompanying drawings, characterised in that:

FIG. 1 is a side view in cross-section, taken along line B—B of FIG. 2 of a single drum cream depositing machine in accordance with the invention;

FIG. 2 is an end view in cross-section;

Figure 3:
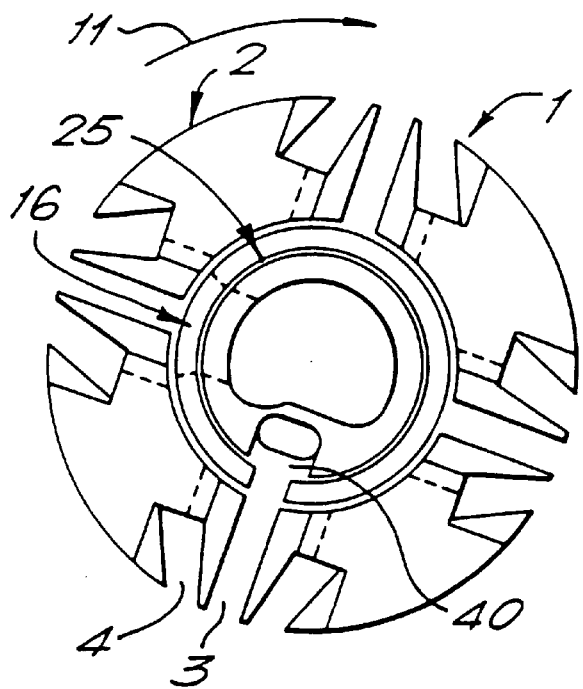
Figure 4:
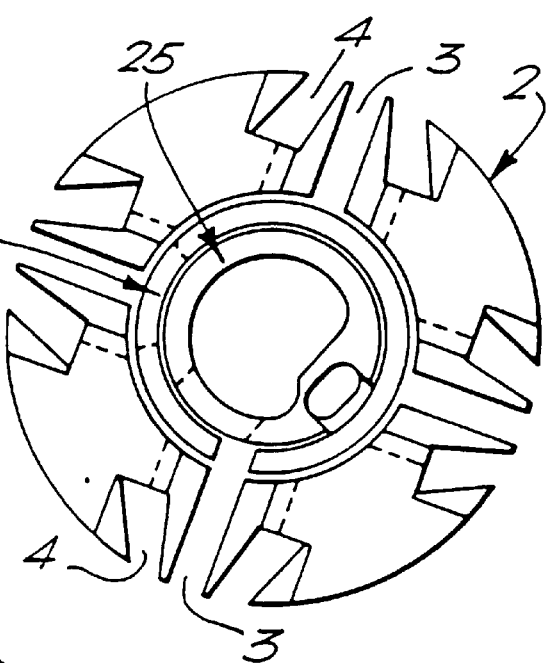
Figure 5:
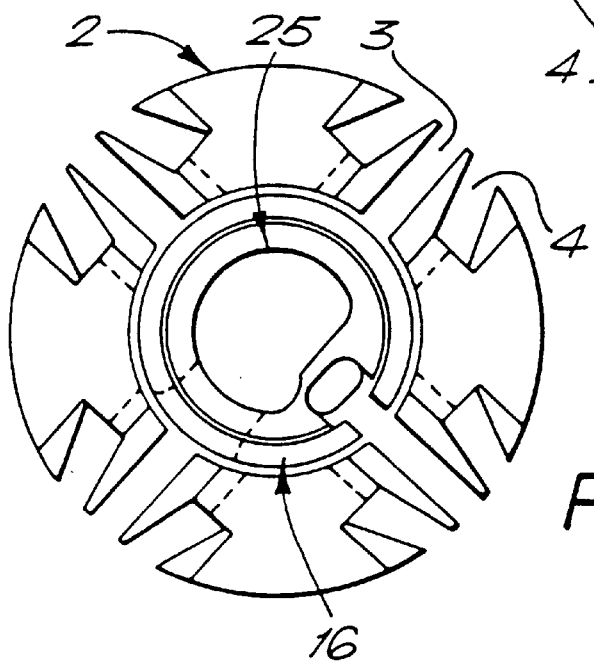
Figure 6:
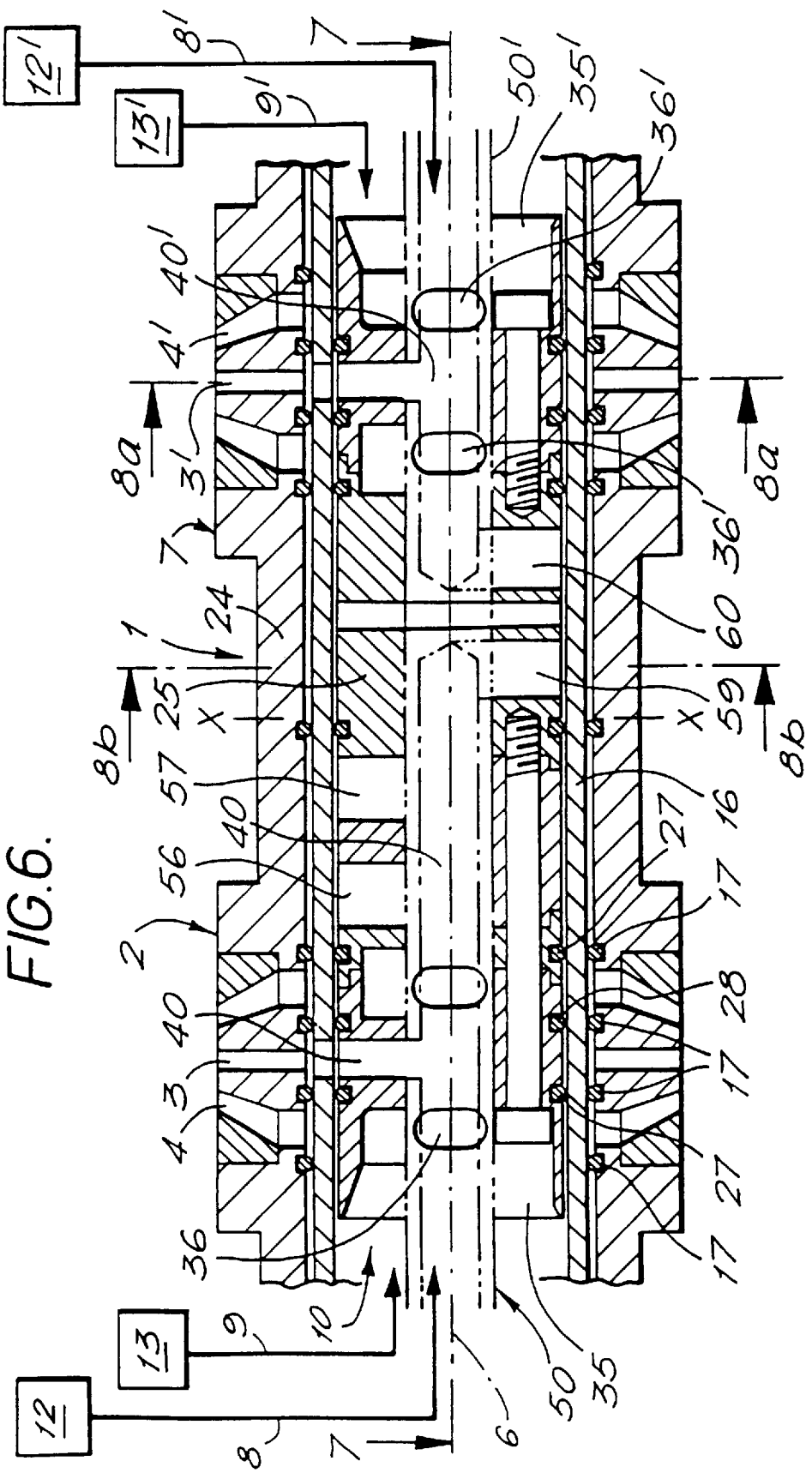
Figure 7:
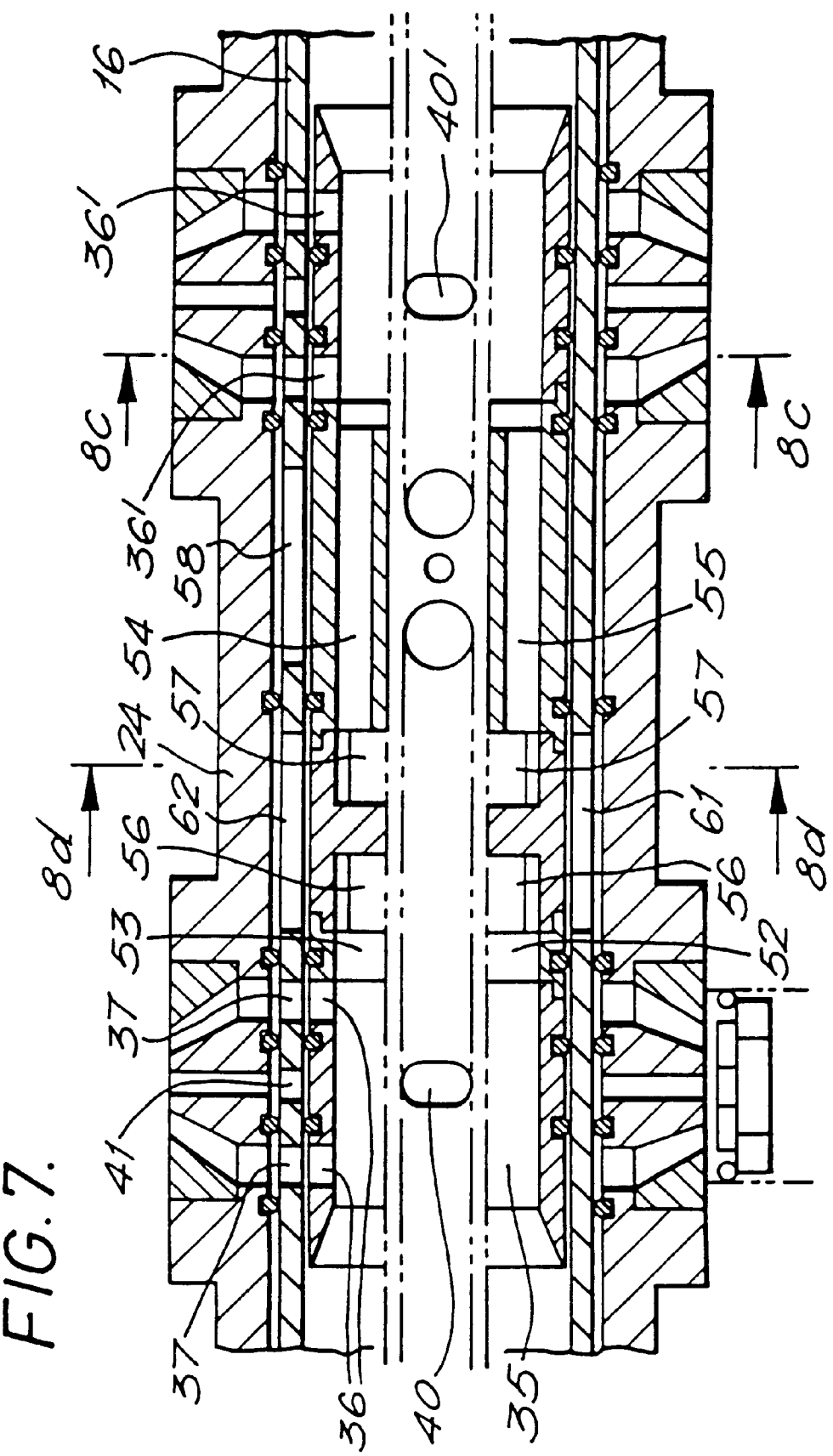
Figure 8A:
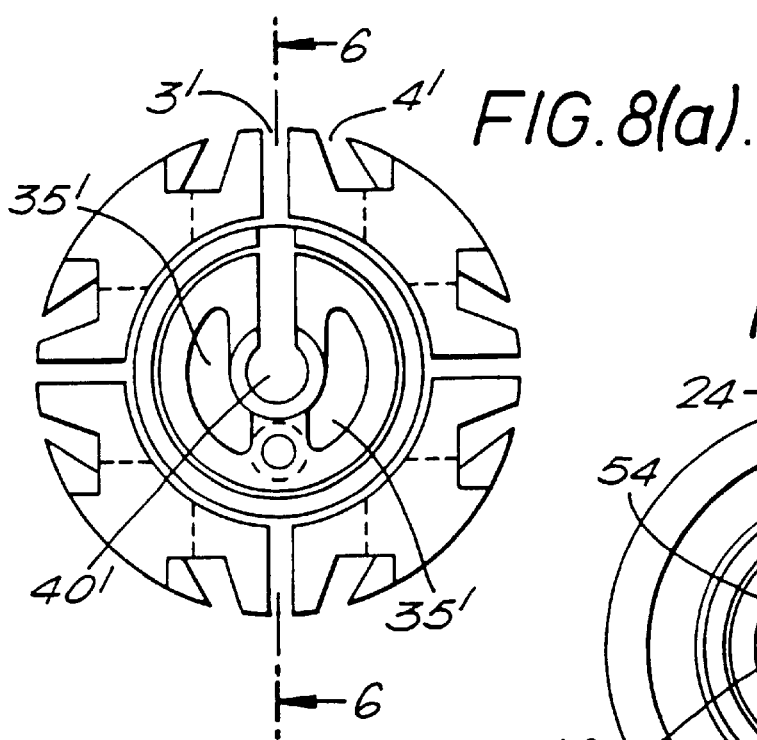
Figure 8B:
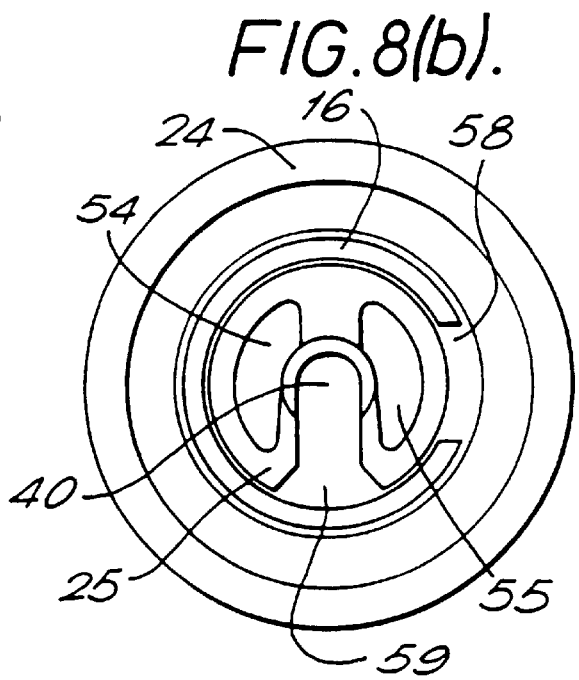
Figure 8C:
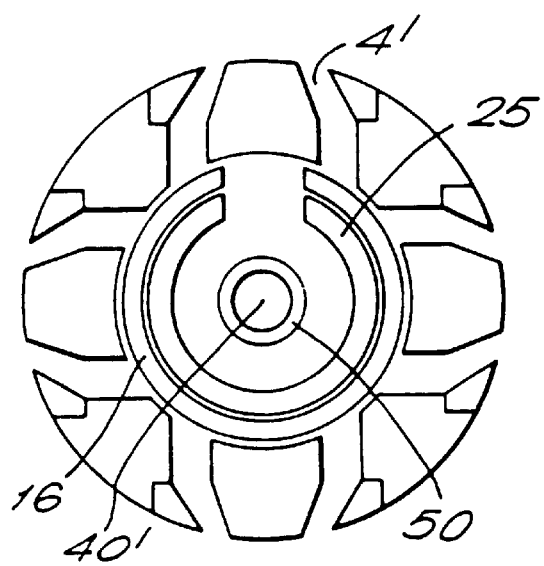
Figure 8D:
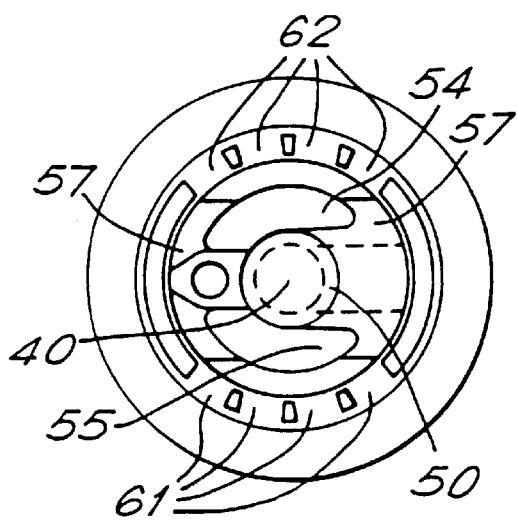
Figure 9:
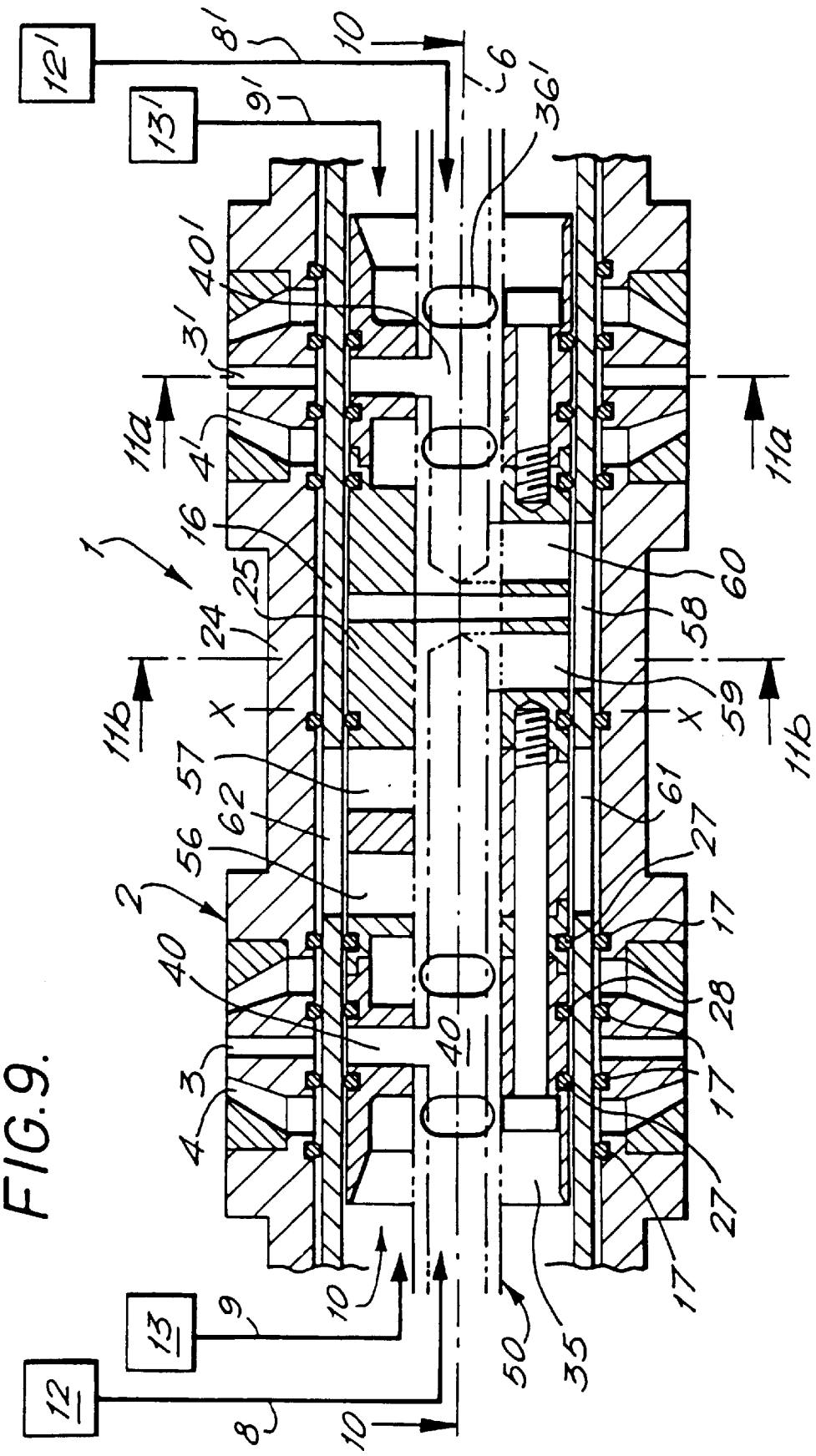
Figure 10:
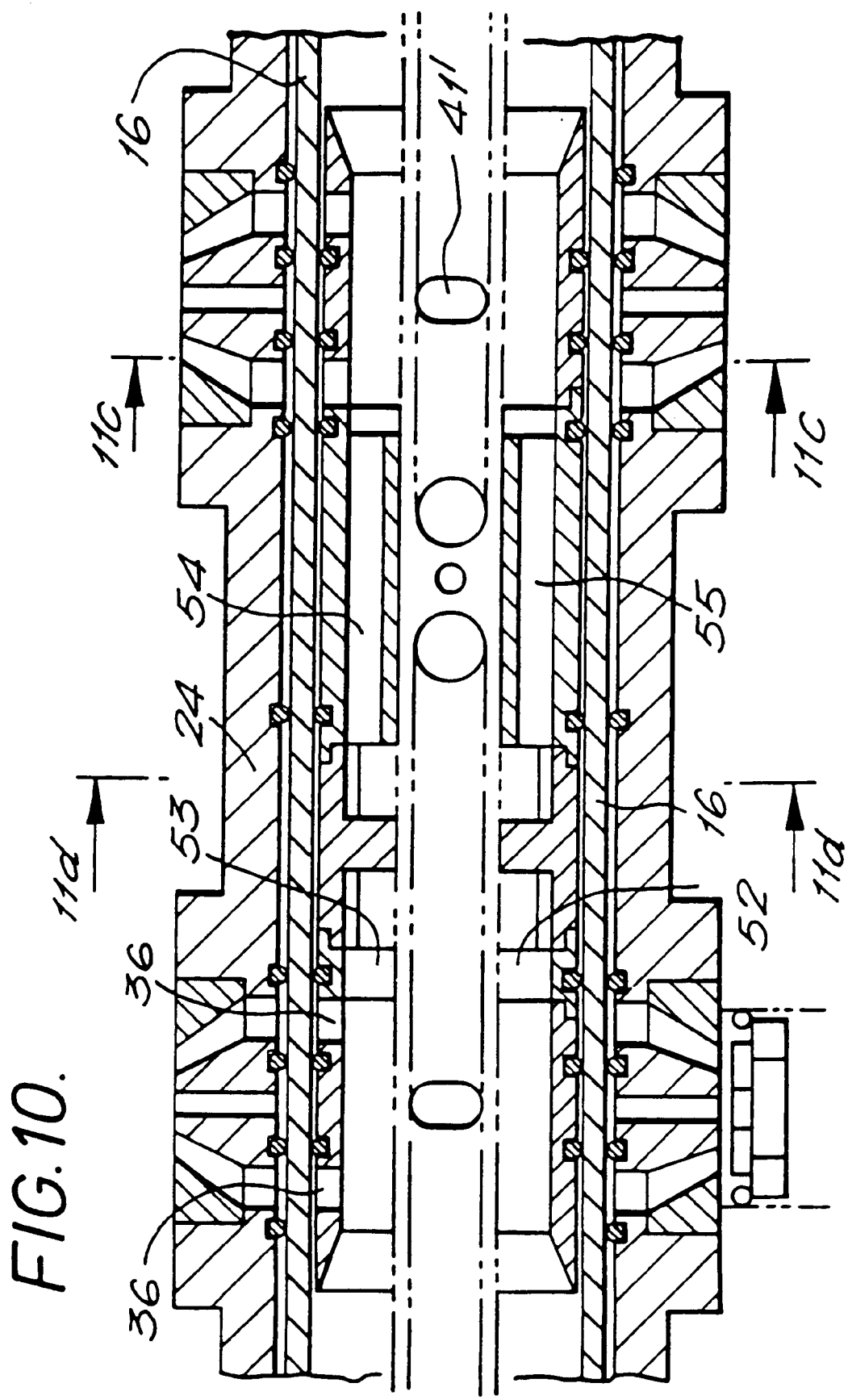
Figure 11A:
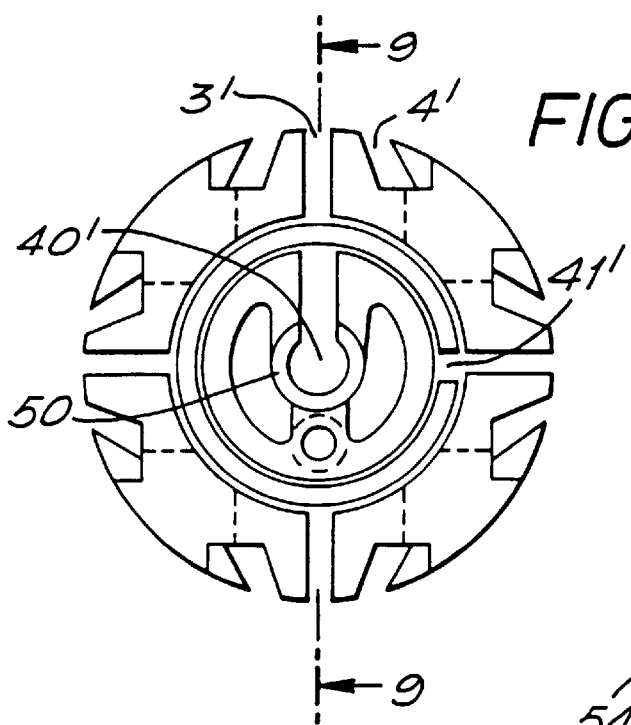
Figure 11B:
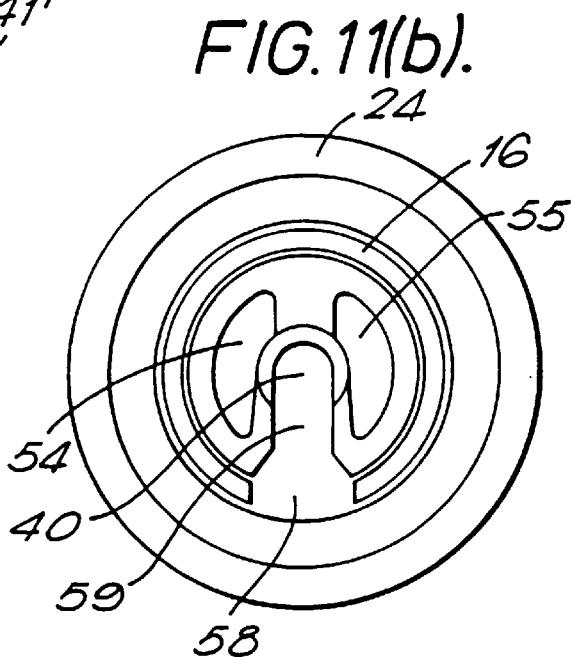
Figure 11C:
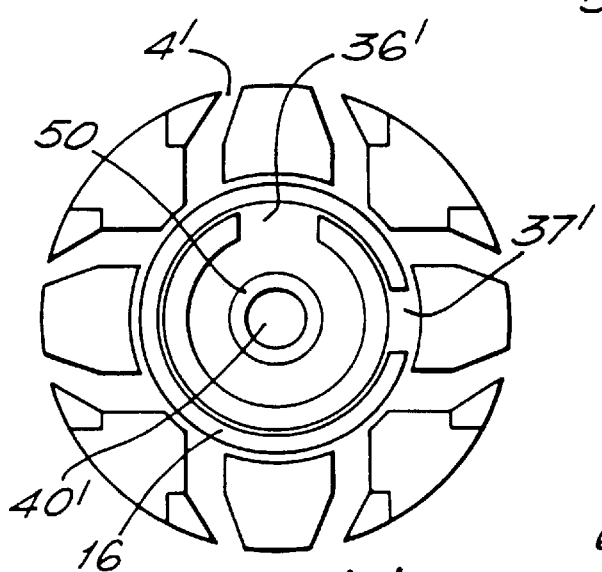
Figure 11D:
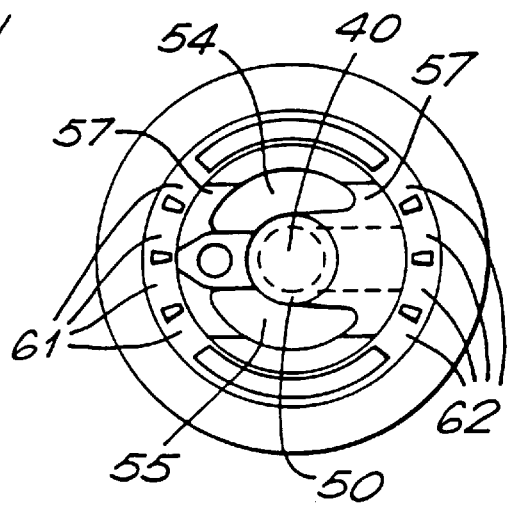
Figure 12:
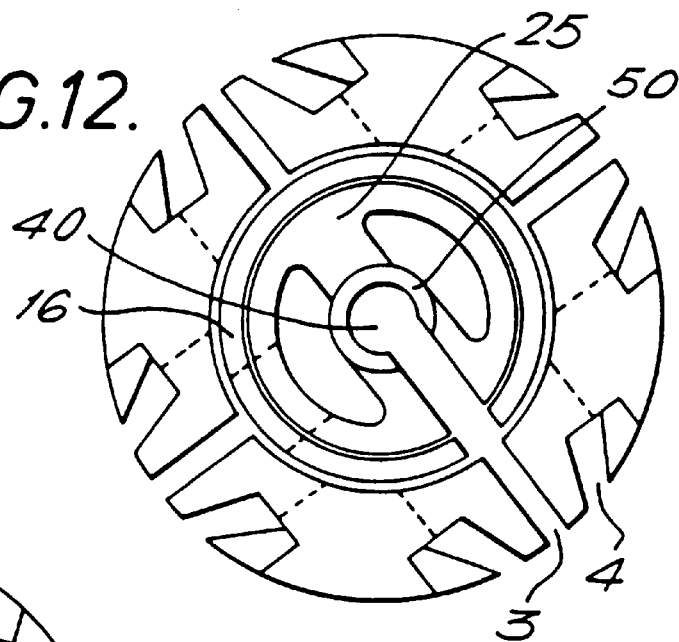
Figure 13:
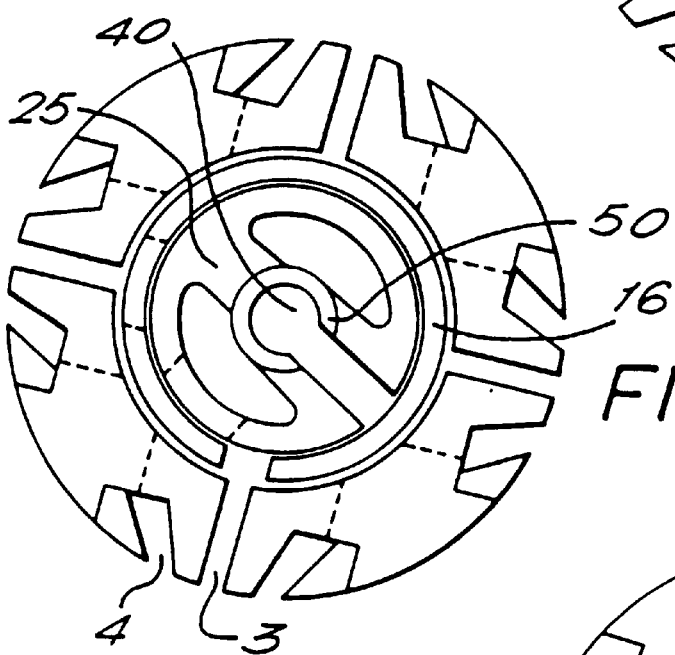
Figure 14:
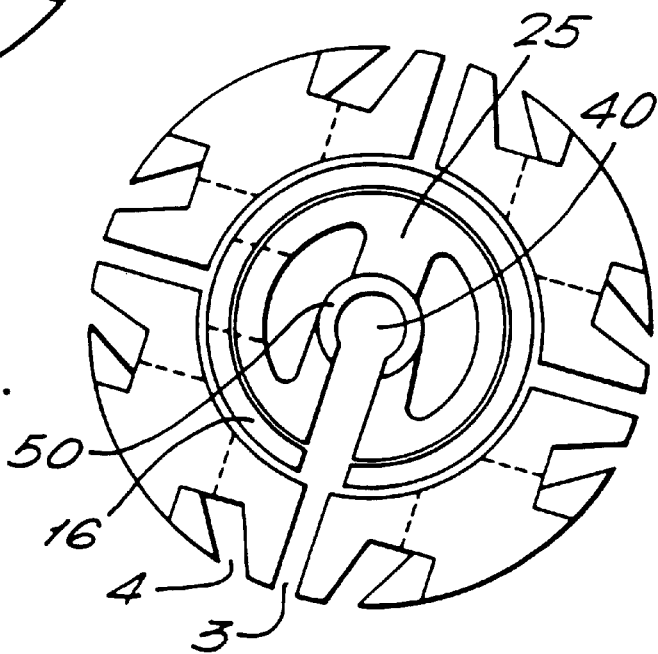

FIGS. 3, 4 and 5 are cross-sections which illustrate relative positions of stencil valve 25 and stencil tube 16 in three different positions, namely running (valve closed), running (valve open) and purge (valve open);

FIG. 6 is a schematic longitudinal cross-section of a dual stencil drum assembly in accordance with the invention, taken on the line 6—6 of FIG. 8(*a*), and showing the stencil tube and valve member in a valve open, running condition;

FIG. 7 is a section of the dual stencil drum assembly of FIG. 6 taken on the line 7—7 of FIG. 9 and showing the assembly in the valve open, running condition;

FIG. 8 shows various transverse cross-sections of the dual stencil drum assembly of FIGS. 6 and 7, FIG. 8(*a*) being on the line 8(*a*)—8(*a*) of FIG. 6, FIG. 8b on the line 8(*b*)—8(*b*) of FIG. 6, FIG. 8(*c*) on line 8(*c*)—8(*c*) of FIG. 7, and FIG. 8(*d*) on line 8(*d*)—8(*d*) of FIG. 7;

FIG. 9 is a section similar to FIG. 6 but showing the stencil tube turned to define the valve closed, running condition;

FIG. 10 is a section similar to FIG. 7 but showing the stencil tube turned as in FIG. 9 to define the valve closed, running condition;

FIG. 11 shows various transverse cross-sections of the dual stencil drum assembly of FIGS. 9 and 10, FIG. 11(a) being on the line 11(a)—11(a) of FIG. 9, FIG. 11(b) on the line 11(b)—11(b) of FIG. 9, FIG. 11(c) on the line 11(c)—11(c) of FIG. 10, and FIG. 11(d) on line 11(d)—11(d) of FIG. 10;

FIG. 12 is a transverse cross-section similar to the section of FIG. 8(a) but showing the drum assembly in a valve open, purge condition;

FIG. 13 is a section similar to that of FIG. 11(a) but showing the drum assembly in a valve closed, running condition; and FIG. 14 is a section similar to that of FIG. 8(a) but showing the drum assembly in a valve open running condition.

With reference to FIGS. 1 and 2, a cream depositing machine 1 comprises a rotatable stencil drum 2 having a series of first and second stencil ports 3, 4 disposed in four groups angularly around the circumference of the drum 2, at substantially 90° spacings. Each group comprises a single port 3 surrounded by an outer port 4 of annular form, the ports 3, 4 being disposed in close proximity.

A chain drive sprocket 5 mounted on the stencil drum 2 comprises means for causing the drum to rotate in timed sequence about its longitudinal axis 6, as indicated by arrow 11 (FIG. 2). Such drive means are well known in the art and need not be described here in further detail.

Source means 12 and 13 are provided for the pumped supply of first 8 and second 9 cream material separately to each group of stencil ports 3, 4 in a manner described hereinafter.

Cream flow control means 10 within the stencil drum 2, are operable, in timed sequence, (caused by drum rotation), to initially cause first cream material 8 to issue from the central stencil port 3, and thereafter, after angular movement of 90° of the stencil drum 2, to cause second cream material 9 to issue from the second or outer stencil port 4 surrounding the central port 3, whereby separate deposits of first and second cream material 8, 9 co-exist on the stencil drum 2.

Means comprising a stationary cutting wire 15, in light contact with the stencil drum 2 is provided for simultaneously removing the co-existing deposits of cream. The same method is used in the art to remove single deposits of cream.

The cream flow control means 10 comprise a stationary stencil tube 16 disposed co-axially within the stencil drum 2 in close-fitting relationship. 'O'-ring seals 17, 18 are disposed between the drum 2 and tube 16. The control means 10 further comprise a close-fitting stencil valve member 25 of generally cylindrical form disposed within the stencil tube 16 so as to rotate relative thereto. O-ring seals 26, 27, 28, 29 are disposed between the valve member 25 and the tube 16. The valve 25 is normally stationary but may be rotated to an inoperative position by means of a shaft 30.

The O-rings 17, 18 and 26 to 29 ensure that the two cream materials 8, 9 remain separate and do not mix.

The stencil valve member 25 has a hollow interior 35 open to the bore of the stencil tube 16 so as to receive cream material 9, and a pair of ports 36 which, as shown, can be aligned with through-ports 37 in the tube 16 and with the stencil port 4.

The stencil valve member 25 is also formed with an internal passageway 40 providing communication between the bore of the stencil tube 16 and a through-port 41 formed in the tube 16, the port 41 can be alignable, as shown, with the central stencil port 3.

Thus outward flow of cream material from the ports 3, 4 takes place by way of the interior of the valve member 25.

In a typical sequence of operation, the stencil tube 16 and stencil valve member 25 are relatively disposed in the running position illustrated by FIG. 3. As the stencil drum 2 rotates, the annular stencil port 4 comes first into register with the through-ports 37 in the stencil tube 16 and the ports 36 in the stencil valve member 25, as shown in the bottom half of FIG. 1. While the ports 4, 37 and 36 are in register, the second cream material 9 is extruded from the port 4, forming a deposit that is retained on the outer portion of the stencil drum 2. The stencil drum 2 continues to rotate until that part of the drum carrying the deposit assumes the position shown in the upper half of FIG. 1. In this position the central stencil port 3 is in register with through-port 41 in the stencil tube 16 and with the outlet of passageway 40 in the in the stencil valve member 25, again, as shown in the upper half of FIG. 1. While the ports 3, 41, and the passageway 40 are in register, the first cream material 8 is extruded from the port 3 forming a central deposit that is retained on the stencil drum 2, in the centre of the first-mentioned deposit. In this manner a composite deposit of concentric form is formed on, and adheres to, the surface of the stencil drum 2 without any prior contact or mixing between the two cream materials 8. 9. As the stencil drum 2 is rotated further, the composite deposit is cut from the drum by means of the stationary wire 15 in contact with the drum 2. It is then deposited on a biscuit in the conventional manner.

FIGS. 4 and 5 illustrate alternative relative positions of the stencil valve member 25 and stencil tube 16. FIG. 4 illustrates a closed valve, machine running position and FIG. 5 a cream purging position, with valve member 25 open, that is, the radial openings in the valve member are in register with openings in the stencil tube 16. When purging takes place, purging liquid is substituted for the cream material source means.

The invention is applicable to the formation of composite deposits of cream materials, not necessarily of two-material form, and not necessarily of the pattern described above, where central and outer deposits co-exist.

Similarly, the invention is not restricted to use of a stencil drum having four groups of stencil ports. Indeed, any pattern of angularly-spaced stencil ports may be used that is compatible with the relative timing of the rotation of the stencil drum and biscuits conveyed therebelow.

In a non-illustrated modification, both cream materials are fed, not in counterflow as shown in FIG. 1, but instead flow concurrently from the same side of valve member 25.

This may be done by employing coaxial tubes defining an annular space characterised in that the central tube contains one cream material and the annular space the other cream material.

In this arrangement the valve member 25 is modified so that the passageway 40 is disposed on the same side of the valve member as its hollow interior 35, care being taken to ensure that the two cream materials remain separate and do not come in contact with each other.

A further embodiment of the present invention will now be described with reference to FIGS. 6 to 14 in which like reference numerals refer to similar parts to those of the embodiments of FIGS. 1 to 5.

With reference to FIGS. 6 to 12, a cream depositing machine 1 comprises a dual drum assembly 24 comprising two axially spaced-apart drums 2, 7 arranged in tandem, a stencil tube 16 and a close fitting valve member 25 of generally cylindrical shape disposed therein.

A first first-cream supply means 12 and a second first-cream supply means $12^1$ are provided for the pumped supply of first cream 8 and $8^1$ material respectively to the stencil ports 3, $3^1$ respectively of the drums 2 and 7 respectively. A first second-cream supply means 13 and a second second-cream supply means $13^1$ are provided for the supply of second cream 9 and $9^1$ material to the stencil ports 4, $4^1$ respectively of the drums 2, 7 respectively. Thus there are four separate cream supplies to the different ports 3, $3^1$, 4, $4^1$.

The first cream material 8 is transported, via an inner operating tube 50, into an inner passageway 40 disposed co-axially within the stencil tube 16. The outer surface of the tube 50 and the inner surface of the tube 16 define a space which transports the second cream material 9 therethrough.

The operating sequence for the issue of first and second creams is substantially as described hereinbefore in the first embodiment.

The dual stencil drum 24 rotates about the stationary stencil tube 16. The two rotatable stencil drums 2 and 7 each comprise first and second ports 3, 4 located at intervals around the circumference. The stencil tube 16 is provided with slots 37 and ports 41, the slots 37 and ports 41 extending through the wall of the tube 16. The stencil valve 25 is formed with ports 36, $36^1$ and internal axial passageways 40, $40^1$.

The internal passage way 40 extends from the tube 50 beyond the through port 41 along the direction of longitudinal axis 6. A radial connection port 59 extends from the passageway 40 to confront the inner surface of the stencil tube 16. A second radial connection port 60 also confronts the stencil tube 16 and extends from a second axial passageway $40^1$ which extends from a second axial tube $50^1$ which extends from the source means $12^1$, to beyond the ports $3^1$, $4^1$. The passage way $40^1$ supplies the rotatable stencil drum 7 with the first cream material.

The valve member 25 comprises at opposite ends thereof hollow interiors 35, $35^1$ open to the bore of the stencil tube which provides communication between the bore of the tube and the ports 36, $36^1$. The valve member 25 also comprises connection means in the form of internal valve ports 52, 53, 54, 55, 56 and 57.

The internal valve ports 52, 53 provide a communication passage between the hollow interior 35 and the internal valve port 56.

The stencil tube 16 is also formed with connection slots 58, 61 and 62 in the form of cut out sections through the wall of stencil tube 16. The connection slot 58 provides a communication passage between connection port 59 and port 60. The connection slots 61 and 62 provide communication between internal valve ports 56 and 57.

The depositing machine 1, as described hereinbefore in the first embodiment, had three operation conditions, these being valve open running position, valve open purging position and valve closed running position.

The second embodiment of FIGS. 6 to 14 has three operating conditions similar to those of the first embodiment of FIGS. 1 to 5.

FIGS. 6, 7 and 8 illustrate the valve open running condition. During this operating condition the ports 36 and 40 are aligned with the ports 37 and 41 respectively, so providing sequenced delivery of the two creams, as described hereinbefore for the first embodiment.

During the valve open running condition, the connection slots 61 and 62 are not aligned with the transfer ports 56 and 57, so there is no transfer of primary cream through the connection slots 61 and 62. The connection slot 58 is not aligned with the connection ports 59 and 60 so there is no transfer of secondary cream through the slot 58. The first first-cream supply means 12 and the first second-cream supply means 13 are isolated from the second first-cream supply means $12^1$ and the second second-cream supply means $13^1$ so the two stencil drums 2 and 7 are supplied by independent supply means.

FIGS. 9, 10 and 11 illustrate the valve closed running position. During this operating condition the stencil tube 16 has been rotated so that the ports 37 are no longer aligned with ports 35 and ports 41 are no longer aligned with ports 40. The dual drum stencil 24 continues to rotate.

During the valve closed running position the connection slots 61 and 62 are aligned with the transfer ports 56 and 57 so providing a communication for the two primary cream supplies therethrough. The connection slot 58 is aligned with the connection ports 59 and 60 so providing a communication for the two secondary cream supplies therethrough.

The supply means 12, 13 are in communication with the supply means $12^1$, $13^1$ respectfully.

During the valve closed running position the supply means for one of the rotatable stencil drums will be stopped. The pressure of the primary and secondary cream within the supply tubes of the stopped source means will decrease. There will be a pressure difference between the two source means. The build-up of pressure on one side will force the primary and secondary creams to flow in one direction towards the stopped source means.

The valve closed running position may be used for short stoppages of the production line so helping to keep subsequent start up times to a minimum.

The creams are kept flowing within the supply tubes (not shown) and through the depositing machine 1 so helping to prevent the cream setting, and providing recirculation.

The valve member 25 is moved angularly relative to the stencil tube 16 between the open valve and closed valve position with the use of pneumatics.

It will be appreciated that the method of recirculation hereinbefore described is not restricted to a dual stencil drum with each drum having four stencils. Any pattern of angularly-spaced stencils may be used which is compatible with the desired timing of the stencil drum rotation and/or the speed of any conveyor utilised.

During the purge position, as shown in FIG. 12, the dual stencil drum discontinues rotation and is stationary. The stencil tube 16 (stencil valve 25?) is manually rotated to align the ports to allow flow of material from the ports 3, 4. In this operating position any trapped gas may be expelled from the machine prior to start up.

A typical but not exclusive sequence of operations is described hereinafter.

The depositing machine 1 is initially in the valve closed position and the dual stencil drum at rest. The stencil tube 16 would then be rotated manually to the purge position and the drum rotated to bring ports 3, 4 into register with ports 40, 37, as shown in FIG. 12, and supply tubes would be purged expelling unwanted material from the tubes and from depositing machine. The stencil tube 16 would then be rotated to the valve closed running position, as shown in FIG. 13, and the drum would start rotation. As the drum begins to rotate the valve member 25 moves to the open valve running position as shown in FIG. 14, and the cream material is deposited from the machine.

In a modification, not illustrated, the ports 4 are of rectangular outline for depositing a rectangular deposit of cream on a biscuit.

We claim:

1. A cream depositing machine comprising a rotatable stencil drum (2; 24) having stencil port means (3, 4; 3, $3^1$, 4, 4¹), means (5) for rotating the drum, and cream supply means (12, 13; 12, 13, 12¹, 13¹) for supplying cream to the port means in the stencil drum wherein the stencil port means comprises first and second stencil ports (3, 4; 3, 3¹, 4, 4¹), disposed in close proximity, the cream supply means comprises a first-cream supply means (12; 12, 12¹) and a second-cream supply means (13; 13, 13¹) for supplying first and second cream material separately to each of the ports, cream control means (10, 16) within the drum and operable, in time sequence, to initially cause the first cream material to issue from the first stencil port (3; 3, 3¹) and thereafter, after angular movement of the stencil drum, to cause the second cream material to issue from the second stencil port (4; 4, 4¹) whereby deposits of the first and second cream material co-exist on the stencil drum, and means (15) for simultaneously removing said co-existing deposits.

2. A machine as claimed in claim 1, wherein the cream control means comprise a stencil tube (16), a flow control valve (25), and through-openings (37, 41) formed in the stencil tube for outward flow of cream material from the interior of the stencil tube.

3. A machine as claimed in claim 2, wherein the flow control valve comprises a generally cylindrical valve member (25) disposed within the stencil tube (16) and rotatable relative thereto.

4. A machine as claimed in claim 2, wherein the stencil tube is formed with separate through-openings (41, 37) angularly spaced from each other and alignable in turn, with said first and second stencil ports (3, 4; 3, 3¹, 4, 4¹).

5. A machine as claimed in claim 3, wherein flow of cream material from the stencil ports takes place by way of the interior of the valve member.

6. A machine as claimed in claim 1, wherein said first and second stencil ports comprise a central port (3; 3, 3¹) surrounded by an outer port (4; 4, 4¹) of annular form.

7. A machine as claimed in claim 1, provided with angularly-spaced groups of said first and second stencil ports.

8. A machine as claimed in claim 1 comprising two such stencil drums (2, 7) arranged in tandem for rotation together, a first first-cream supply means (12) and a first second-cream supply means (13) for supplying one (2) of the stencil drums separately with first and second cream materials, a second first-cream supply means (12¹) and a second second-cream supply means (13¹) for supplying the other stencil drum (7) separately with first and second cream materials, and connection means (58, 59, 60) selectively operable to connect the first first-cream supply means (12) to the second first-cream supply means (12¹).

9. A machine as claimed in claim 8 in which the connection means is also selectively operable to connect (by 56, 57, 62) the first second-cream supply means (13) to the second second-cream supply means (13¹).

10. A machine as claimed in claim 8 in which the connection means comprises passages (58, 61, 62) formed in the stencil tube (16).

11. A machine as claimed in claim 10 in which the passages are in the form of connection channels (58, 61, 62) in the wall of the stencil tube.

12. A machine as claimed in claim 11 in which the connection means comprises connection ports (56, 57, 59, 60) in the flow control valve, the valve being operable to register the connection ports with the connection channels.

* * * * *